US008208930B2

(12) United States Patent
Askerup et al.

(10) Patent No.: US 8,208,930 B2
(45) Date of Patent: Jun. 26, 2012

(54) MESSAGE ROUTING IN A TELECOMMUNICATION SYSTEM

(75) Inventors: Anders H. Askerup, Omaha, NE (US); Michael R. Kelly, Omaha, NE (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1540 days.

(21) Appl. No.: 11/471,780

(22) Filed: Jun. 21, 2006

(65) Prior Publication Data

US 2007/0297419 A1    Dec. 27, 2007

(51) Int. Cl.
*H04W 40/00* (2009.01)

(52) U.S. Cl. ........ 455/445; 370/400; 370/392; 370/389; 370/352; 370/446; 709/245; 709/225; 709/227; 455/435.1

(58) Field of Classification Search ............... 455/456.3, 455/435.1, 456.6, 450, 456.1, 352, 254, 401, 455/428, 445; 370/331, 338, 328, 352, 401, 370/400, 392, 389; 709/204, 245, 227, 115.03; 379/221.01
See application file for complete search history.

(56) References Cited

U.S. PATENT DOCUMENTS

| | | | |
|---|---|---|---|
| 6,304,651 B1* | 10/2001 | Cramer et al. | 379/221.01 |
| 6,721,401 B2 | 4/2004 | Lee et al. | |
| 6,871,070 B2 | 3/2005 | Ejzak | |
| 6,954,654 B2 | 10/2005 | Ejzak | |
| 6,996,087 B2 | 2/2006 | Ejzak | |
| 2004/0068574 A1 | 4/2004 | Costa et al. | |
| 2004/0107252 A1* | 6/2004 | Futa et al. | 709/204 |
| 2004/0203710 A1 | 10/2004 | Gabor et al. | |
| 2004/0246948 A1* | 12/2004 | Lee et al. | 370/352 |
| 2004/0248587 A1* | 12/2004 | Niemenmaa | 455/456.1 |
| 2005/0010644 A1* | 1/2005 | Brown et al. | 709/206 |
| 2005/0078642 A1* | 4/2005 | Mayer et al. | 370/338 |
| 2005/0105496 A1* | 5/2005 | Ambrosino | 370/338 |
| 2005/0182683 A1* | 8/2005 | Tischer | 705/26 |
| 2005/0272440 A1* | 12/2005 | Li | 455/456.1 |
| 2005/0286495 A1* | 12/2005 | Menon et al. | 370/352 |
| 2006/0002308 A1* | 1/2006 | Na et al. | 370/252 |

(Continued)

FOREIGN PATENT DOCUMENTS

EP    1643719 B1    4/2006

OTHER PUBLICATIONS

Camarillo G et al ~ "The Session Initiation Protocol (SIP) P-User-Database Private-Header (P-Header)" rfc4457.txt ~ Apr. 2006.

(Continued)

*Primary Examiner* — Rafael Pérez-Gutiérrez
*Assistant Examiner* — Joseph Arévalo

(57) ABSTRACT

A method for routing message traffic over a communication network. In one example, the method comprises receiving, at a first server, a request from a subscriber terminal and transmitting, from the first server to a subscriber location function of the network, a message requesting routing information to a user database serving the subscriber terminal. A response message is transmitted from the subscriber location function of the network to the first server, the response message including routing information for a second server instead of the user database, wherein the response message is transmitted in a format indicating to the first server that communication with the user database has occurred when it has not. The first server receives the response message transmitted by the subscriber location function and transmits the request from the subscriber terminal to the second server.

25 Claims, 2 Drawing Sheets

U.S. PATENT DOCUMENTS

| | | | |
|---|---|---|---|
| 2006/0018272 A1* | 1/2006 | Mutikainen et al. | 370/328 |
| 2006/0030320 A1* | 2/2006 | Tammi et al. | 455/435.2 |
| 2006/0031294 A1* | 2/2006 | Poikselka | 709/204 |
| 2006/0046714 A1* | 3/2006 | Kalavade | 455/428 |
| 2006/0067338 A1 | 3/2006 | Hua et al. | |
| 2006/0077965 A1* | 4/2006 | Garcia-Martin et al. | 370/352 |
| 2006/0211423 A1* | 9/2006 | Ejzak et al. | 455/445 |
| 2006/0245406 A1* | 11/2006 | Shim | 370/338 |
| 2007/0008925 A1* | 1/2007 | Dravida et al. | 370/331 |
| 2007/0010248 A1* | 1/2007 | Dravida et al. | 455/435.1 |
| 2007/0010261 A1* | 1/2007 | Dravida et al. | 455/456.3 |
| 2007/0042779 A1* | 2/2007 | Eikkula | 455/445 |
| 2007/0115934 A1 | 5/2007 | Dauster et al. | |
| 2007/0115935 A1* | 5/2007 | Qiu et al. | 370/352 |
| 2007/0149211 A1* | 6/2007 | Dunn et al. | 455/456.1 |
| 2007/0155399 A1* | 7/2007 | Alberth et al. | 455/456.1 |
| 2007/0298806 A1* | 12/2007 | Venkatachalam | 455/450 |

OTHER PUBLICATIONS

PTO Search Report ~ dated Nov. 28, 2001 ~ PCT/US2007/014080.

* cited by examiner

MESSAGE ROUTING IN A TELECOMMUNICATION SYSTEM

BACKGROUND

Telecommunication networks, such as an Internet Protocol Multimedia Subsystem (IMS) network, may include network components provided by more than one manufacturer or supplier. Although standard communication protocols exist, it is possible that incompatibilities may arise. These incompatibilities may arise even where all of the equipment within a network is provided by the same manufacturer, simply because some network elements may comply with different revisions of the standard communication protocol. Proper message routing, and consequent proper operation of network components, should be ensured regardless of equipment manufacturer or software revision.

DETAILED DESCRIPTION

The IP Multimedia Subsystem (IMS) is a standardized architecture that allows a telecommunication system operator to provide multimedia content to mobile and fixed subscribers. IMS utilizes Voice-over-IP (VoIP) with a standardized implementation of the Session Initiation Protocol (SIP). In IMS, telephone systems, whether packet-switched or circuit-switched, are supported.

Figure 1:
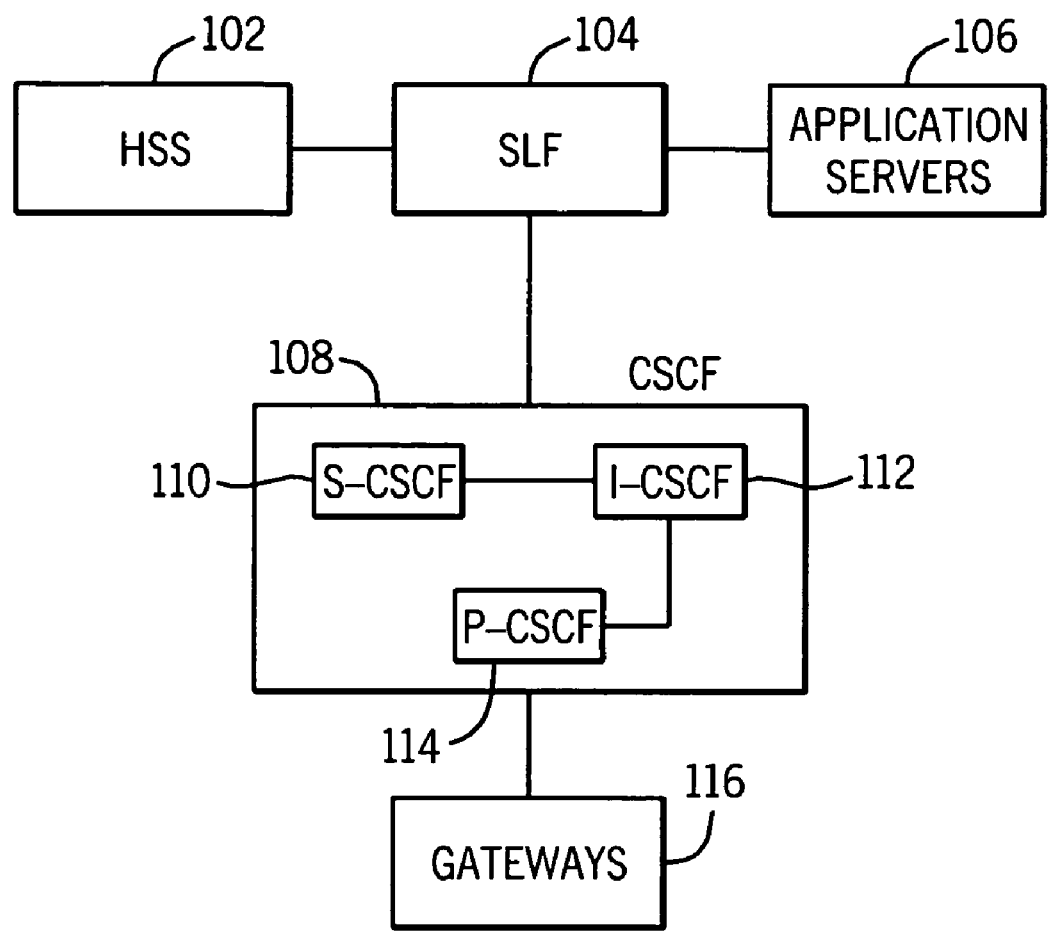
FIG. 1 is a block diagram of a portion of an IMS network, in accordance with an embodiment.

FIG. 1 is a block diagram of a portion of an IMS network, in accordance with an embodiment. Generally, IMS is a collection of different functions that are linked by standardized interfaces. This is sometimes referred to as the "Core Network" of IMS. The functions of IMS should not be confused with the network nodes found in a conventional network. In IMS, the system architect may feel free to combine two or more functions within a node. In an embodiment, an IMS network includes an Access Network and a Core Network.

The Access Network permits various types of users to connect to the IMS to take advantage of a range of services that may include voice, images, video, etc. In an embodiment, direct IMS terminals can connect directly to an IMS if the devices can use Version 6 of the Internet Protocol and are running SIP User Agents (described in more detail subsequently). Fixed, mobile, and wireless access are supported by IMS. Fixed networks such as DSL, cable, and Ethernet can connect to IMS, and so can mobile devices such as cellular phones, regardless of system. In other words, IMS can interface with cellular devices on GSM systems, W-CDMA, CDMA2000, etc. Wireless access is supported for wireless LANs, and even hardwired, landline telephones (the old POTS phone) can connect to IMS through a gateway 116.

The Core Network includes at least one Home Subscriber Server, or HSS 102, that is usually referred to as a master user database supporting the IMS network entities that are actually handling the calls or sessions. The HSS 102 contains the subscription-related information such as user profiles, performs authentication and authorization of the user, and can provide information about the physical location of the user, much like the HLR (Home Location Register) and AUC (Authentication Center) in a GSM system.

SIP signaling packets, as noted above, are used over IMS. As is known in the art, SIP stands for Session Initiation Protocol, and was originally developed by IETF as a standard for initiating, modifying, and terminating an interactive user session that involves multimedia elements. SIP is one of the leading protocols used in VoIP (Voice over Internet Protocol), along with H.323, which is also a VoIP signaling protocol.

In an embodiment related to session control, IMS employs a number of SIP servers or proxies 108. A P-CSCF 114, or Proxy Call Session Control Function, is a SIP proxy that acts as the first point of contact for an IMS terminal. A P-CSCF 114 is assigned to an IMS terminal at registration, and does not change for the duration of the registration. It also authenticates the user, and, since other nodes trust the P-CSCF 114, authentication does not have to be repeated.

An I-CSCF 112, or Interrogating CSCF, is a SIP proxy whose IP address is published in the DNS (Domain Name Server) of its domain, so that remote servers can find it and use it as an entry point for SIP packets directed toward this domain. Normally, the I-CSCF 112 uses the DIAMETER protocol, which is an authentication, authorization, and accounting (AAA) protocol used over a variety of networks (specifically the Cx and Dx interfaces) to query the HSS 102 and retrieve the user location, and then route the SIP request to its assigned S-CSCF 110.

The S-CSCF 110, or Serving CSCF, is a node of the signaling plane in IMS. It's a SIP server that performs session control and is generally located in the subscriber's home network. The S-CSCF 110 uses DIAMETER interfaces to the HSS 102 to download and upload user profiles. The S-CSCF 110 handles SIP registrations, which allows it to form an association between the user location (the IP address of the terminal) and the SIP address. It sits on the path of all signaling messages, and can inspect various messages. It also decides to which application servers 106 the SIP message will be forwarded to, in order to provide their services.

When there are multiple HSSs 102, as would generally be the case in a large system, a Subscriber Location Function (SLF) 104 is desired. The HSSs 102 and the SLF 104 both use the DIAMETER protocol. The SLF 104 is used to locate the subscriber's HSS 102 from the I-CSCF 112 or the S-CSCF 110. The SLF 104 maintains a database with subscriber identities in the network, and knows the address of the HSS 102 that serves a given subscriber identity.

The SLF 104 in IMS is a superset of a DIAMETER Redirect Agent. As such, it redirects DIAMETER-based messages from the DIAMETER client to the next hop DIAMETER agent based upon some criterion, such as policy and/or subscriber identity. A method embodiment goes beyond DIAMETER routing, and also allows SIP-based messaging to be routed based on internally managed routing conditions, such as subscriber identity. In a large system with network components provided by different manufacturers (Vendor A and Vendor B, for example) both vendors may have their own IMS network elements, such as HSSs, I-CSCFs, and P-CSCFs.

If a Vendor A I-CSCF receives a SIP-INVITE message from a Vendor B terminal, the Vender A I-CSCF queries the SLF 104 for DIAMETER-based routing information to the HSS. However, the SLF 104 in the embodiment of FIG. 1 can determine whether an incompatibility exists between the current I-CSCF and the HSS hosting the subscriber. As noted previously, the SLF 104 stores information about the subscriber, including, for example, an identity or range of identities, the associated HSS, etc. As a result, detection of a potential (or known) incompatibility can be accomplished through pre-provisioned data, or by having the SLF 104 look at the message payload, or by a combination of the two. If the Cx interface (or Cx-like interface) between the current I-CSCF and the HSS hosting the subscriber are not compatible, then a method embodiment ensures that message routing occurs in a fashion that allows network communication to continue. For example, the message routing methodology "fools" the requesting I-CSCF into believing that the SLF 104 has communicated with the HSS, and will return a SIP address to which the SIP-INVITE or SIP-REGISTER message is to be forwarded.

When the SLF 104 receives a query from a requesting I-CSCF, and no incompatibility is detected, the SLF communicates with the subscriber's HSS and returns DIAMETER-based routing information associated with the HSS for the particular subscriber identity. If an incompatibility is detected, the SLF 104 knows that the I-CSCF may have a problem communicating with the HSS for that subscriber identity. So, instead of returning routing information for the HSS, the SLF 104 returns the address of an I-CSCF that is DIAMETER-compatible with the HSS that is hosting the requesting subscriber. The requesting I-CSCF functions advantageously under these conditions, because the requesting I-CSCF believes that the returned routing information identifies an S-CSCF to which a SIP-INVITE or SIP-REGISTER message can properly be sent.

The requesting I-CSCF ends up sending the SIP-INVITE or SIP-REGISTER message to the compatible I-CSCF instead, and operation proceeds normally. This process works because the requesting I-CSCF believes it has actually communicated with an HSS and received proper routing information. In reality, the requesting I-CSCF has indeed received valid routing information, but not from the HSS. The SLF has simply "fooled" the requesting I-CSCF into thinking that communication with an HSS has taken place.

Thus, routing of message traffic in a telecommunication network is advantageously provided by a method and apparatus in which a request from a subscriber terminal is received at a first server. The first server transmits a message to a subscriber location function of the network requesting routing information to a user database serving the subscriber terminal. A response message is transmitted from the subscriber location function of the network to the first server, the response message including routing information for a second server instead of the user database, wherein the response message is transmitted in a format indicating to the first server that communication with a user database has occurred when it has not. The first server receives the response message transmitted by the subscriber location function and transmits the request from the subscriber terminal to the second server.

Figure 2:
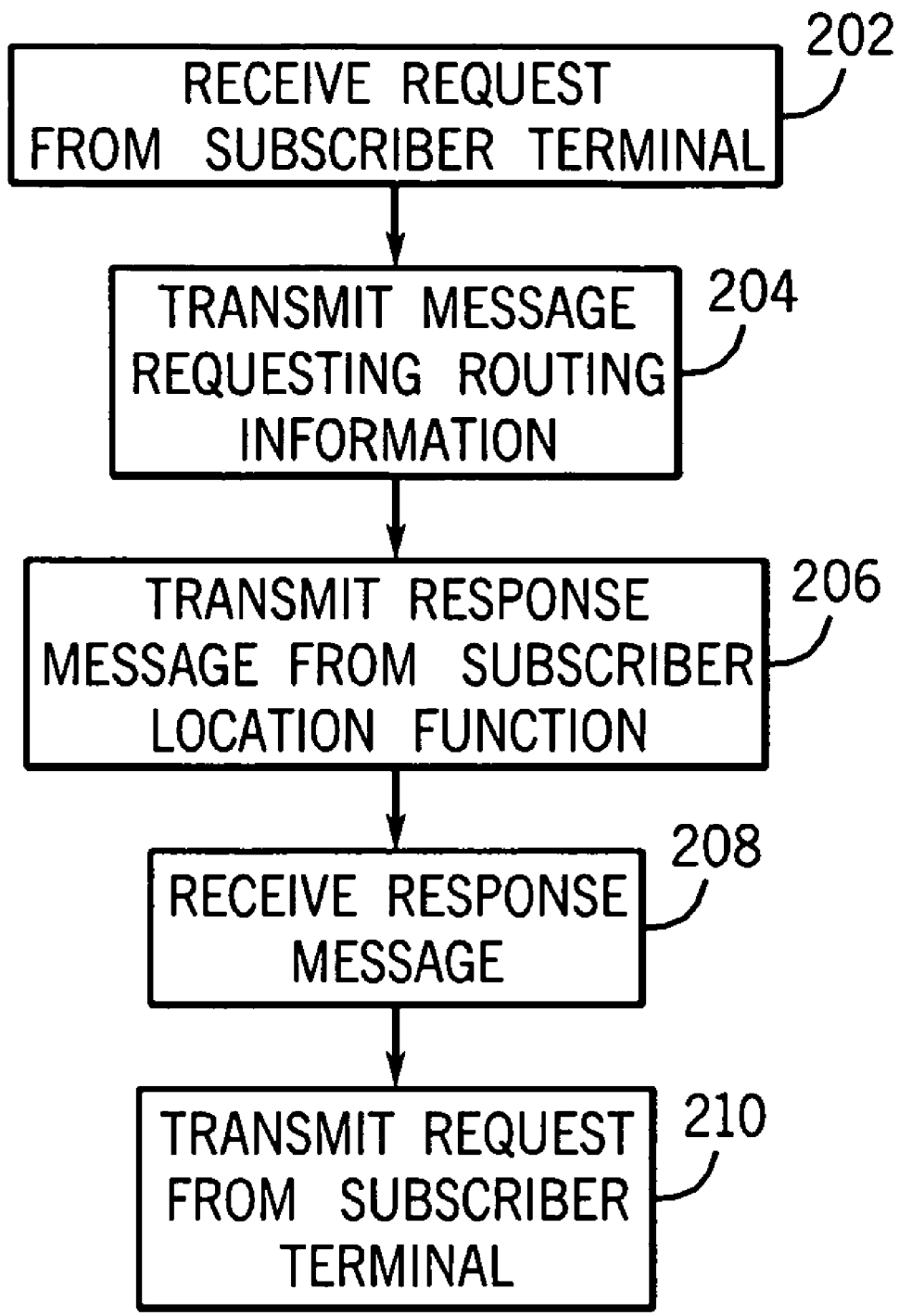
FIG. 2 is a flowchart of a message routing methodology, in accordance with an embodiment.

FIG. 2 is a flowchart of a message routing methodology, in accordance with an embodiment. An I-CSCF (a first SIP proxy, for example) receives a SIP request from a subscriber terminal in step 202. In accordance with an embodiment, it would either be a SIP-REGISTER or a SIP-INVITE. A SIP-REGISTER is a type of SIP request that attempts to register the address listed in the To header field of the message with a SIP server. A SIP-INVITE indicates a user or service is being invited to participate in a call session.

In subsequent step 204, the I-CSCF sends a message to a core network function that performs subscriber location. This is the SLF 104, and the I-CSCF communicates with the SLF 104 using DIAMETER-based messaging. If the original message from the subscriber terminal was a SIP-INVITE, the I-CSCF sends a Location-Information-Request or LIR message to the SLF 104. If the original message from the subscriber terminal was a SIP-REGISTER, the I-CSCF sends a User-Authorization-Request or UAR message to the SLF 104.

The I-CSCF expects a Redirect-Host Attribute Value Pair (or AVP) in response to its DIAMETER message. The AVP should properly contain routing information for the HSS that serves the requesting subscriber. Instead, in step 206, the SLF 104 returns a Server-Name AVP (normally returned by an HSS, in accordance with an embodiment) that includes routing information for a second SIP proxy (another I-CSCF) that is actually compatible with the requesting subscriber's HSS.

Once it receives this message in step 208, the I-CSCF believes that it has successfully communicated with an HSS, and that the routing information it has received actually identifies an S-CSCF (a SIP server that is the central node of the signaling plane). So the I-CSCF simply transmits the SIP-REGISTER or SIP-INVITE message in step 210, believing that it will be received by the S-CSCF. Instead, the transmitted SIP-REGISTER or SIP-INVITE message is received by another I-CSCF that is compatible with the requesting user's HSS. This message routing ensures that network communication continues properly.

The actual message returned by the SLF 104 depends upon the DIAMETER-based message that it originally receives. For a SIP-INVITE, the I-CSCF sends an LIR and expects a Location-Information-Answer or LIA message in return. For a SIP-REGISTER, the I-CSCF sends a UAR and expects a User-Authorization-Answer or UAA in response. As noted above, no matter which message it receives, the SLF 104 returns a UAA or LIA with a Server-Name AVP instead of a Redirect-Host AVP, so the requesting I-CSCF believes that it has received an appropriate response from the HSS that identifies the S-CSCF to which the original SIP request should be sent.

In practice, the IMS functions such as I-CSCF and SLF are implemented in computer software on network-connected server platforms including high-performance processors and high-capacity storage elements such as hard disk subsystems. The computer program code that implements particular network element functions is stored on computer-readable media, such as the hard disk system, and executed by the processor.

Thus, routing of message traffic in a telecommunication network is provided by an apparatus comprising means for receiving, at a first server, a request from a subscriber terminal and means for transmitting, from the first server to a subscriber location function of the network, a message requesting routing information to a user database serving the subscriber terminal. The apparatus further comprises means for transmitting, from the subscriber location function of the network to the first server, a response message that includes routing information for a second server instead of the user database, wherein the response message is transmitted in a format indicating to the first server that communication with the user database has occurred when it has not, means for receiving, at the first server, the response message transmitted by the subscriber location function, and means for transmitting, from the first server to the second server, the request from the subscriber terminal.

The steps or operations described herein are intended as examples. There may be many variations to these steps or operations without departing from the spirit of the invention. For instance, the steps may be performed in a differing order, or steps may be added, deleted, or modified.

Although examples of implementations of the invention have been depicted and described in detail herein, it will be apparent to those skilled in the relevant art that various modifications, additions, substitutions, and the like can be made without departing from the spirit of the invention and there are therefore considered to be within the scope of the invention as defined in the following claims.

What is claimed is:

1. A method for routing message traffic over a communication network, the method comprising the steps of:
   (a) receiving, at a first server, a request from a subscriber terminal;
   (b) transmitting, from the first server to a subscriber location function of the network, a message requesting routing information to a user database serving the subscriber terminal;
   (c) transmitting, from the subscriber location function of the network to the first server, a response message that includes routing information for a second server instead of the user database, wherein the response message is transmitted in a format indicating to the first server that communication with a user database has occurred when it has not;
   (d) receiving, at the first server, the response message transmitted by the subscriber location function; and
   (e) transmitting, from the first server to the second server, the request from the subscriber terminal.

2. The method in accordance with claim 1, wherein the communication network comprises an IP Multimedia Subsystem (IMS) network.

3. The method in accordance with claim 1, wherein the step (a) of receiving, at a first server, a request from a subscriber terminal further comprises the step of receiving, at a first server, a SIP request from a subscriber terminal.

4. The method in accordance with claim 3, wherein the SIP request comprises a SIP-INVITE.

5. The method in accordance with claim 3, wherein the SIP request comprises a SIP-REGISTER.

6. The method in accordance with claim 1, wherein the step (b) of transmitting, from the first server to a subscriber location function of the network, a message requesting routing information to the user database serving the subscriber terminal further comprises the step of transmitting, from an I-CSCF, a DIAMETER-based message to a Subscriber Location Function (SLF) requesting routing information to a Home Subscriber Server (HSS) serving the subscriber terminal.

7. The method in accordance with claim 6, wherein the DIAMETER-based message comprises a Location-Information-Request (LIR) message.

8. The method in accordance with claim 6, wherein the DIAMETER-based message comprises a User-Authorization-Request (UAR) message.

9. The method in accordance with claim 1, wherein the step (c) of transmitting, from the subscriber location function of the network to the first server, a response message that includes routing information for a second server instead of the user database further comprises the step of transmitting, from a Subscriber Location Function (SLF), a DIAMETER-based response message including a Server-Name Attribute Value Pair (AVP) including routing information for a second I-CSCF that is compatible with a Home Subscriber Server (HSS) that serves the subscriber terminal.

10. The method in accordance with claim 9, wherein the step of transmitting a Server-Name AVP instead of a Redirect-Host AVP indicates to the first server that communication with the user database has occurred when it has not.

11. A method for routing message traffic over an IMS network, the method comprising the steps of:
    (a) receiving, at a first I-CSCF, a SIP request from a subscriber terminal;
    (b) transmitting, from the first I-CSCF, a DIAMETER-based message to a subscriber location function (SLF) requesting routing information to a Home Subscriber Server (HSS) serving the subscriber terminal;
    (c) transmitting, from the SLF to the first I-CSCF, a DIAMETER-based response message including a Server-Name Attribute Value Pair (AVP) that includes routing information for a second I-CSCF that is compatible with an HSS that serves the subscriber terminal instead of routing information for the HSS, wherein the step of transmitting a Server-Name AVP instead of a Redirect-Host AVP indicates to the first I-CSCF that communication with an HSS has occurred when it has not;
    (d) receiving, at the first I-CSCF, the response message transmitted by the subscriber location function; and
    (e) transmitting, from the first I-CSCF to the second I-CSCF, the request from the subscriber terminal.

12. The method in accordance with claim 11, wherein the SIP request comprises a SIP-INVITE.

13. The method in accordance with claim 11, wherein the SIP request comprises a SIP-REGISTER.

14. The method in accordance with claim 11, wherein the DIAMETER-based message comprises a Location-Information-Request (LIR) message.

15. The method in accordance with claim 11, wherein the DIAMETER-based message comprises a User-Authorization-Request (UAR) message.

16. An apparatus for routing message traffic over a communication network comprising:
    means for receiving, at a first server, a request from a subscriber terminal;
    means for transmitting, from the first server to a subscriber location function of the network, a message requesting routing information to a user database serving the subscriber terminal;
    means for transmitting, from the subscriber location function of the network to the first server, a response message that includes routing information for a second server instead of the user database, wherein the response message is transmitted in a format indicating to the first server that communication with the user database has occurred when it has not;
    means for receiving, at the first server, the response message transmitted by the subscriber location function; and
    means for transmitting, from the first server to the second server, the request from the subscriber terminal.

17. The apparatus of claim 16, wherein the communication network comprises an IP Multimedia Subsystem (IMS) network.

18. The apparatus of claim 16, wherein the means for receiving, at a first server, a request from a subscriber terminal further comprises means for receiving, at a first server, a SIP request from a subscriber terminal.

19. The apparatus of claim 18, wherein the SIP request comprises a SIP-INVITE.

20. The apparatus of claim 18, wherein the SIP request comprises a SIP-REGISTER.

21. The apparatus of claim 16, wherein the means for transmitting, from the first server to a subscriber location function of the network, a message requesting routing information to the user database serving the subscriber terminal further comprises means for transmitting, from an I-CSCF, a DIAMETER-based message to a Subscriber Location Function (SLF) requesting routing information to a Home Subscriber Server (HSS) serving the subscriber terminal.

22. The apparatus of claim 21, wherein the DIAMETER-based message comprises a Location-Information-Request (LIR) message.

23. The apparatus of claim 21, wherein the DIAMETER-based message comprises a User-Authorization-Request (UAR) message.

24. The apparatus of claim 16, wherein the means for transmitting, from the subscriber location function of the network to the first server, a response message that includes routing information for a second server instead of the user database further comprises means for transmitting, from a Subscriber Location Function (SLF), a DIAMETER-based response message including a Server-Name Attribute Value Pair (AVP) including routing information for a second I-CSCF that is compatible with a Home Subscriber Server (HSS) that serves the subscriber terminal.

25. The apparatus of claim 24, wherein the means for transmitting a Server-Name AVP instead of a Redirect-Host AVP indicates to the first server that communication with the user database has occurred when it has not.

\* \* \* \* \*

UNITED STATES PATENT AND TRADEMARK OFFICE
CERTIFICATE OF CORRECTION

| | | |
|---|---|---|
| PATENT NO. | : 8,208,930 B2 | Page 1 of 1 |
| APPLICATION NO. | : 11/471780 | |
| DATED | : June 26, 2012 | |
| INVENTOR(S) | : Anders H. Askerup et al. | |

It is certified that error appears in the above-identified patent and that said Letters Patent is hereby corrected as shown below:

In column 8, lines 7-8, in Claim 25, delete "A VP" and insert -- AVP --, therefor.

Signed and Sealed this
Eighteenth Day of December, 2012

David J. Kappos
*Director of the United States Patent and Trademark Office*